United States Patent
Poyil et al.

(10) Patent No.: US 9,292,763 B2
(45) Date of Patent: Mar. 22, 2016

(54) SYSTEM, METHOD, AND MEDIUM FOR IMAGE OBJECT AND CONTOUR FEATURE EXTRACTION

(71) Applicant: ANALOG DEVICES TECHNOLOGY, Hamilton (BM)

(72) Inventors: Bijesh Poyil, Bangalore (IN); Ramandeep Singh Kukreja, Bilaspur (IN); Anil M. Sripadarao, Bangalore (IN)

(73) Assignee: ANALOG DEVICES GLOBAL, Hamilton (BM)

( * ) Notice: Subject to any disclaimer, the term of this patent is extended or adjusted under 35 U.S.C. 154(b) by 294 days.

(21) Appl. No.: 13/951,193

(22) Filed: Jul. 25, 2013

(65) Prior Publication Data

US 2015/0030250 A1  Jan. 29, 2015

(51) Int. Cl.
  *G06K 9/46* (2006.01)
  *G06K 9/48* (2006.01)
  *G06T 7/00* (2006.01)

(52) U.S. Cl.
  CPC .............. *G06K 9/48* (2013.01); *G06K 9/4638* (2013.01); *G06T 7/0081* (2013.01); *G06T 7/0083* (2013.01); *G06T 7/0085* (2013.01); *G06T 2200/28* (2013.01); *G06T 2207/20136* (2013.01); *G06T 2207/20144* (2013.01); *G06T 2207/20148* (2013.01)

(58) Field of Classification Search
  USPC ........................................................ 382/246
  See application file for complete search history.

(56) References Cited

U.S. PATENT DOCUMENTS

| | | | |
|---|---|---|---|
| 4,718,090 A | 1/1988 | Cooper, Jr. | |
| 5,841,903 A | 11/1998 | Kikuchi | |
| 6,937,765 B2 * | 8/2005 | Skourikhine et al. | 382/199 |
| 7,386,166 B2 | 6/2008 | Curry et al. | |
| 8,155,450 B2 | 4/2012 | Prusia | |
| 8,300,945 B2 | 10/2012 | Campbell | |
| 2009/0067721 A1 | 3/2009 | Kim et al. | |
| 2010/0150443 A1 * | 6/2010 | Zahniser | 382/173 |

(Continued)

FOREIGN PATENT DOCUMENTS

| | | |
|---|---|---|
| CN | 100501762 | 6/2009 |
| DE | 10-2014-109525 | 1/2015 |

(Continued)

OTHER PUBLICATIONS

Mayssaa A. Najjar et al., "Memory-Efficient Architecture for Hysteresis Thresholding and Object Feature Extraction," © 2011 IEEE, 14 pages.
Korean Patent Application Serial No. 10-2014-0092649 filed on Jul. 22, 2014.
Preliminary Rejection issued in KR Patent Application Serial No. 10-2014-0092649 mailed Aug. 19, 2015, 5 pages.
English Translation of Preliminary Rejection issued in KR Patent Application Serial No. 10-2014-0092649 mailed Aug. 19, 2015, 4 pages.
English Machine Translation of Foreign Reference JP 2008-186124, 37 pages.

*Primary Examiner* — Yon Couso
(74) *Attorney, Agent, or Firm* — Patent Capital Group

(57) ABSTRACT

A method includes determining a position and length of a non-zero run in a row of a pixel map. The method also includes determining a number of neighbors for the non-zero run in a preceding row, based at least in part on the position and the length. In addition, the method includes updating a correspondence map of the non-zero run and a correspondence map of a first neighbor of the non-zero run, based at least in part on a correspondence map of a second neighbor of the non-zero run, in response to a determination that the non-zero run has at least two neighbors in the preceding row.

20 Claims, 8 Drawing Sheets

(56) References Cited

U.S. PATENT DOCUMENTS

2013/0129225 A1* 5/2013 Poyil et al. .................... 382/199
2013/0259382 A1* 10/2013 Math ............................ 382/195

FOREIGN PATENT DOCUMENTS

| JP | 2008-186124 | 8/2008 |
| KR | 10-2009-0027373 | 3/2009 |

* cited by examiner

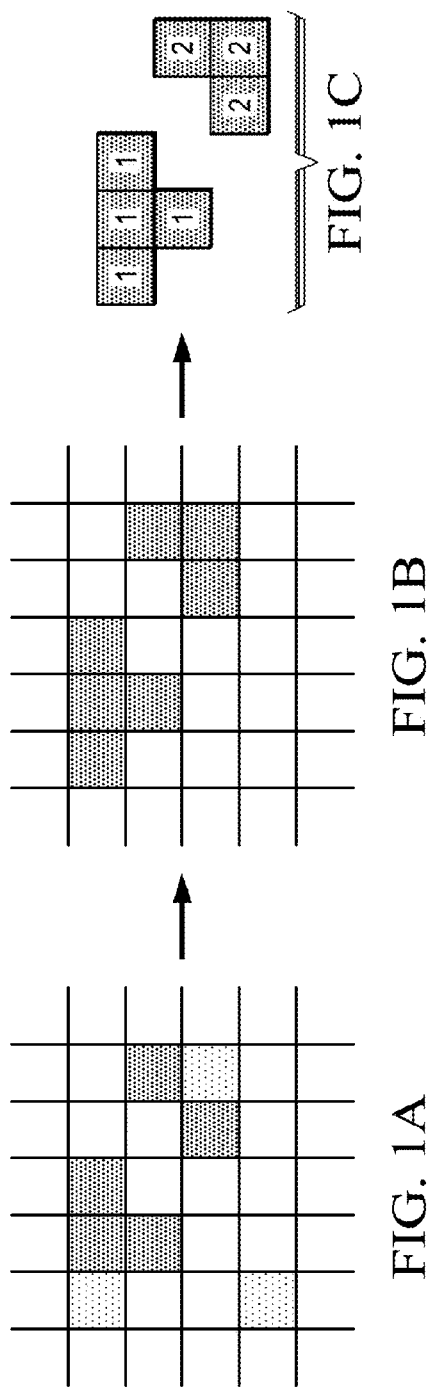

(1,2,2)   (6,2,3)   (10,2,4)
(0,1,2)   (4,1,5)   (7,1,3)   (11,1,4)
(0,3,2)   (5,2,1)   (9,1,6)   (11,1,4)
(2,1,2)   (7,2,1)   (11,1,4)
(3,4,1)   (8,2,1)   (11,1,4)
(9,2,1)
(1,2,7)   (6,2,8)   (10,2,1)
(0,1,7)   (4,1,9)   (7,1,8)   (11,1,1)
(0,3,7)   (5,2,8)   (9,1,10)  (11,1,1)
(2,1,7)   (7,2,8)   (11,1,1)
(3,4,7)   (8,2,7)   (11,1,1)
(8,3,1)
FIG. 4
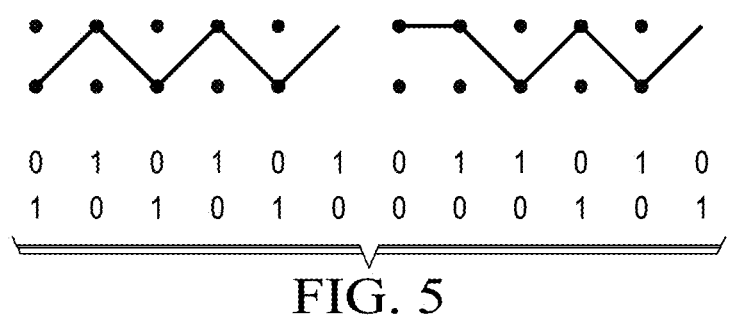
0 1 0 1 0 1 0 1 1 0 1 0
1 0 1 0 1 0 0 0 0 1 0 1
FIG. 5
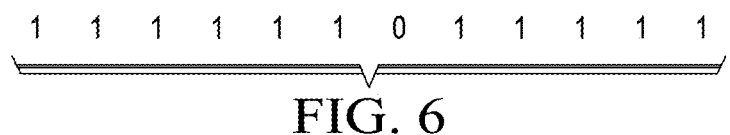
1 1 1 1 1 1 0 1 1 1 1 1
FIG. 6

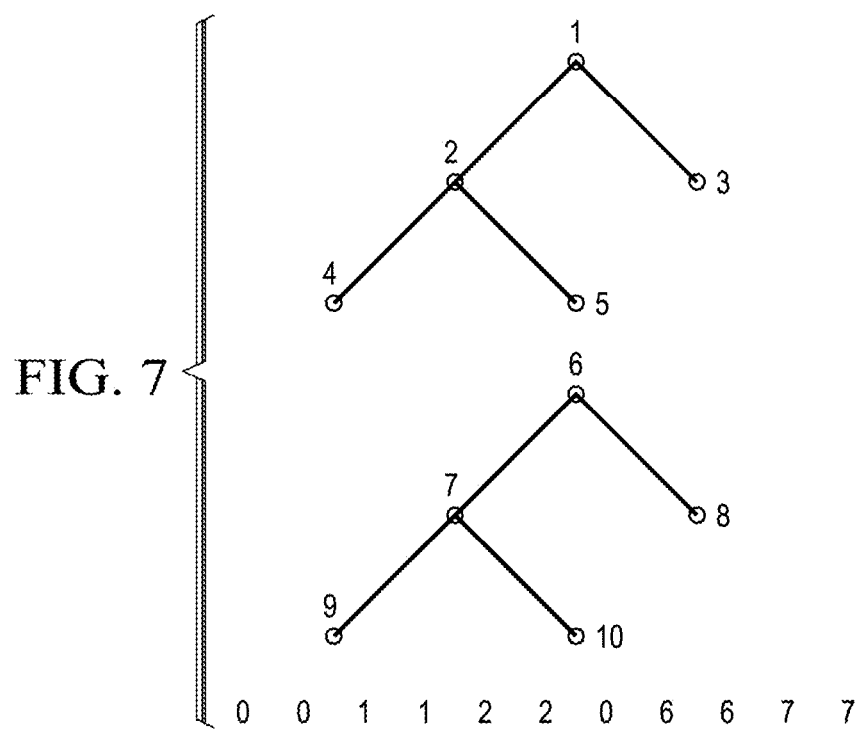
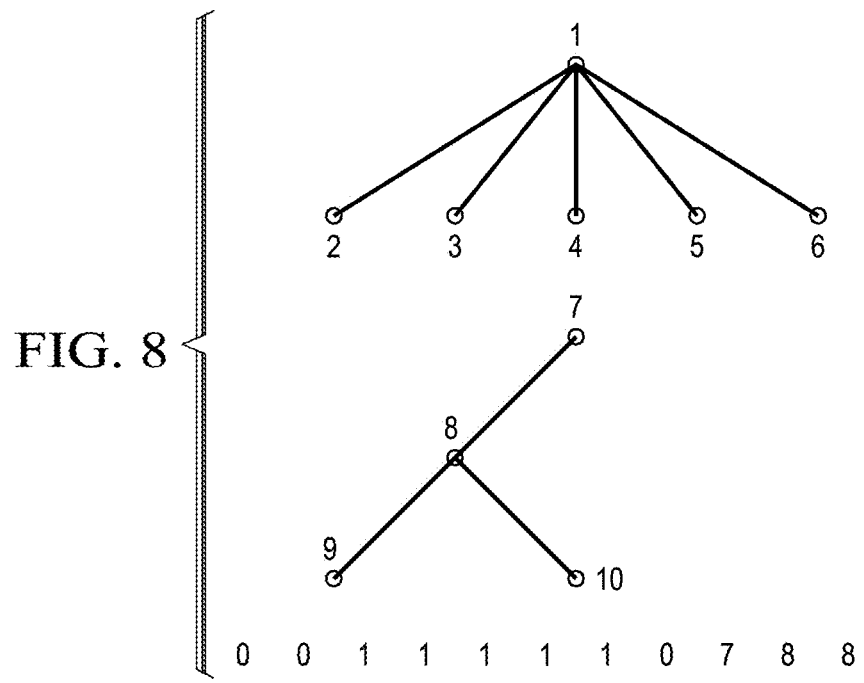

SYSTEM, METHOD, AND MEDIUM FOR IMAGE OBJECT AND CONTOUR FEATURE EXTRACTION

TECHNICAL FIELD

This disclosure relates in general to the field of image processing and, more particularly, to extracting objects or contour features from an image.

BACKGROUND

Thresholding is a fundamental low-level operation in several image processing applications. In its simplest form, thresholding is done on an input image to obtain a binary image including foreground and background pixels that can be further processed to extract an object.

Hysteresis thresholding is a more effective thresholding technique in the presence of noise. Thresholding with hysteresis uses two thresholds: a low threshold Tlo and a high threshold Thi. Pixels having a magnitude greater than the high threshold Thi are marked as strong foreground pixels, and pixels having a magnitude lower than the low threshold Tlo are marked as background pixels. Pixels having a magnitude below the high threshold Thi but above the low threshold Tlo are initially identified as weak foreground pixels. These weak foreground pixels are subsequently considered as strong foreground pixels only if they are connected to a strong foreground pixel (e.g., a pixel with a magnitude above the high threshold Thi).

Further, in many detection applications, a background model is defined. In such applications, instead of comparing a pixel intensity against the low and high thresholds, a difference relative to the background model is compared against low and high thresholds to determine foreground and background pixels.

Both types of thresholding (i.e., absolute magnitude and magnitude relative to a background) can also be applied to a magnitude of a gradient, rather than a pixel magnitude. Then, the thresholding provides edge information of a foreground object rather than giving the complete foreground object itself. This edge information can be used to extract contour properties.

For binary images, conventional algorithms use connected component analysis or contour tracing to extract properties. In such algorithms, a connected component labeling is performed first, and the properties are then extracted from each labeled object. For hysteresis thresholded images, weak foreground pixels are traced to mark them as background or strong foreground pixels. Thus, edge/pixel tracing is performed to classify the weak foreground pixels as either strong foreground or background pixels.

Conventional algorithms for object/contour feature extraction work in many stages or passes over a thresholded image. If the image is hysteresis thresholded, two or more passes are required for classifying the weak foreground/edge pixels as foreground/background pixels. This follows connected component analysis which also requires multiple passes to label each object. For each detected object, properties are extracted or a contour detection algorithm is required to extract the contour and its properties.

Most often, these techniques are time consuming and require multiple passes for contour extraction, especially for objects with concave boundaries. Such contour extraction also requires a large amount of memory resources due to its recursive nature. Further, accesses to the memory are typically random, which makes it difficult to use cache and Direct Memory Access (DMA) for typical embedded processors.

FIG. 1 shows an example of various stages of object/contour feature extraction in an image including two objects. In particular, FIG. 1(a) shows background pixels in white, weak foreground pixels in light grey, and strong foreground pixels in dark grey. FIG. 1(b) shows the binarized image after pixel tracing. The weak foreground pixels have either been discarded or categorized as strong foreground pixels. FIG. 1(c) shows the labeled objects after component labeling. Further, the feature extraction yields sizes of 4 for object 1 and 3 for object 2. There are many techniques proposed for each of the illustrated stages. As these techniques include many stages that require many passes through the image, these techniques consume too much execution time.

One algorithm attempts to extract object features from a binary image in a single pass. However, it uses complex translation tables and merger tables to extract the features. The algorithm does not address hysteresis thresholded images and does not consider contour properties.

Further, a modified algorithm does address hysteresis thresholded images. However, this modified algorithm makes use of the same translation tables and does not attempt to extract contour properties.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 1A-1C illustrate a conventional example of an object feature extraction in a hysteresis thresholded image;

FIG. 3 illustrates an exemplary input pixel map;

FIG. 4 illustrates run-length codes and labels for the pixel map in FIG. 3;

FIG. 5 illustrates an example of a conventional neighbor finding;

FIG. 6 illustrates a pixel map after ORing the two rows in FIG. 5;

FIG. 7 illustrates an example of label trees and an equivalence map for a conventional algorithm before processing the last row of the input edge map in FIG. 3;

FIG. 8 illustrates an example of label trees and an equivalence map for an algorithm before processing the last row of the edge map in FIG. 3 in accordance with one embodiment;

DETAILED DESCRIPTION OF EXAMPLE EMBODIMENTS

Overview

Figure 2A:
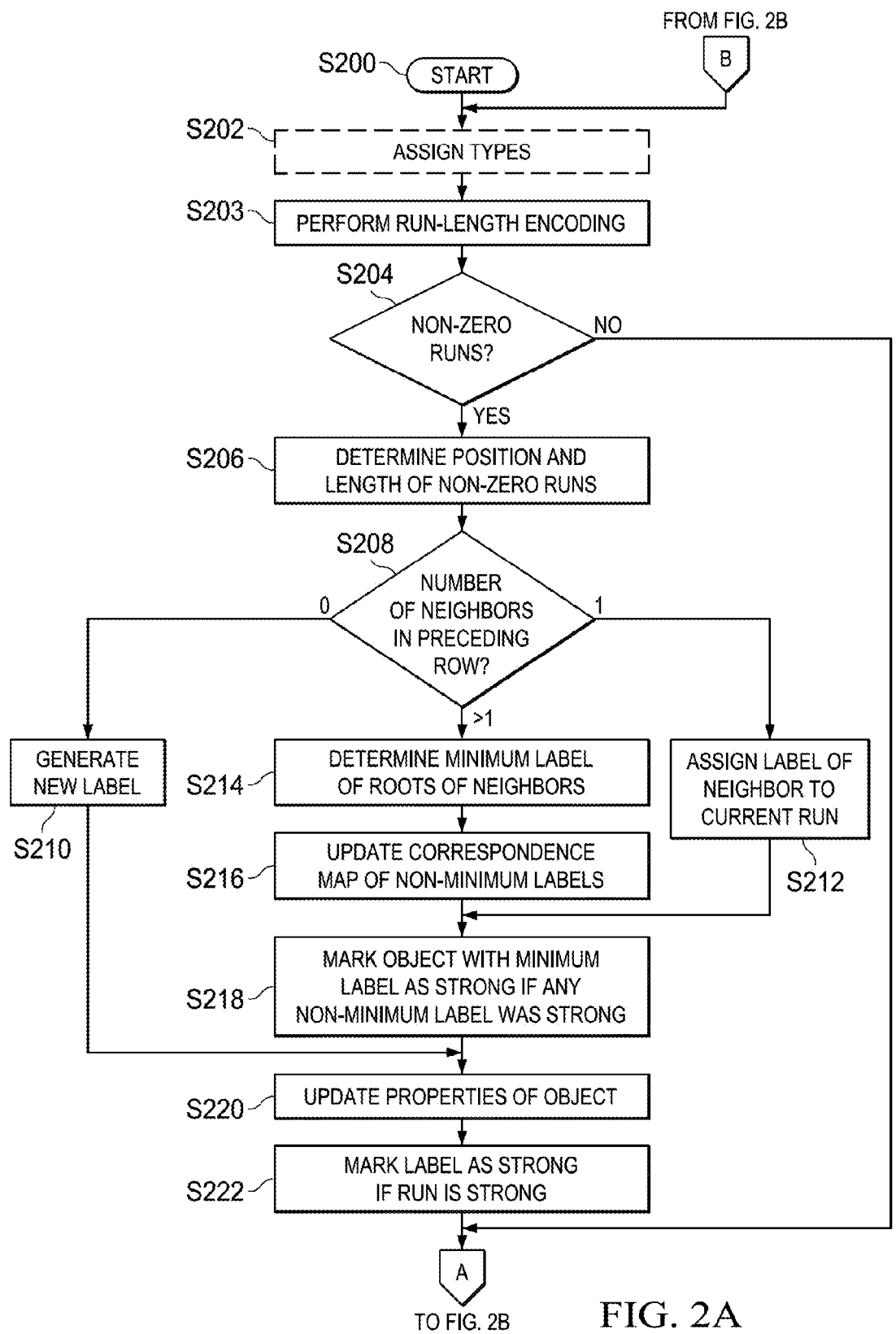
FIGS. 2A-2B are simplified flow diagrams illustrating potential operations associated with one embodiment of the present disclosure.

An algorithm that extracts object features with a single pass over the image is provided in one example. The algorithm quickly identifies neighbors and uses a labeling scheme to restrict the number of labels active at any point. The labeling scheme also helps to identify completed objects with minimal memory or processor resources. The algorithm also attempts to extract approximate contour properties by making use of the property that closed edges of an object are typically the contours of the object. Further, the algorithm avoids random accesses to the memory.

A method is provided in one example and includes determining a position and length of a non-zero run in a row of a pixel map; determining a number of neighbors for the non-zero run in a preceding row, based at least in part on the position and the length; and updating a correspondence map of the non-zero run and a correspondence map of a first neighbor of the non-zero run, based at least in part on a correspondence map of a second neighbor of the non-zero run, in response to a determination that the non-zero run has at least two neighbors in the preceding row.

The method can include assigning to the non-zero run a minimum of roots of the neighbors.

The method can include updating a size of an object including the non-zero run, the first neighbor, and the second neighbor, in response to the determination. The method can also include updating the size of the object based at least in part of the length of the non-zero run.

The method can include determining that an object is completed, in response to a determination that the non-zero run has no neighbors in the preceding row. In one embodiment, the determining the number of neighbors includes ORing the row with the preceding row. The method can include discarding an object, based at least in part on an intensity of a pixel in the non-zero run and a predetermined threshold.

In another example, logic encoded in at least one tangible medium that includes code for execution is provided. The logic, when executed by a processor, is operable to perform operations including determining a position and length of a non-zero run in a row of a pixel map; determining a number of neighbors for the non-zero run in a preceding row, based at least in part on the position and the length; and updating a correspondence map of the non-zero run and a correspondence map of a first neighbor of the non-zero run, based at least in part on a correspondence map of a second neighbor of the non-zero run, in response to a determination that the non-zero run has at least two neighbors in the preceding row.

The operations can include assigning to the non-zero run a minimum of roots of the neighbors.

The operations can include updating a size of an object including the non-zero run, the first neighbor, and the second neighbor, in response to the determination. The operations can also include updating the size of the object based at least in part of the length of the non-zero run.

The operations can include determining that an object is completed, in response to a determination that the non-zero run has no neighbors in the preceding row. In one embodiment, the determining the number of neighbors includes ORing the row with the preceding row. The operations can include discarding an object, based at least in part on an intensity of a pixel in the non-zero run and a predetermined threshold.

In another implementation, an apparatus is provided and includes a processor that determines a position and length of a non-zero run in a row of a pixel map, the processor configured to determine a number of neighbors for the non-zero run in a preceding row, based at least in part on the position and the length, and to update a correspondence map of the non-zero run and a correspondence map of a first neighbor of the non-zero run, based at least in part on a correspondence map of a second neighbor of the non-zero run, in response to a determination that the non-zero run has at least two neighbors in the preceding row.

In one implementation, the processor assigns to the non-zero run a minimum of roots of the neighbors.

In another implementation, the processor updates a size of an object including the non-zero run, the first neighbor, and the second neighbor, in response to the determination. The processor can update the size of the object based at least in part of the length of the non-zero run.

In one example, the processor is configured to determine that an object is completed, in response to a determination that the non-zero run has no neighbors in the preceding row.

In a specific example, the processing unit determines the number of neighbors by ORing the row with the preceding row.

Example Embodiments

Figure 2B:
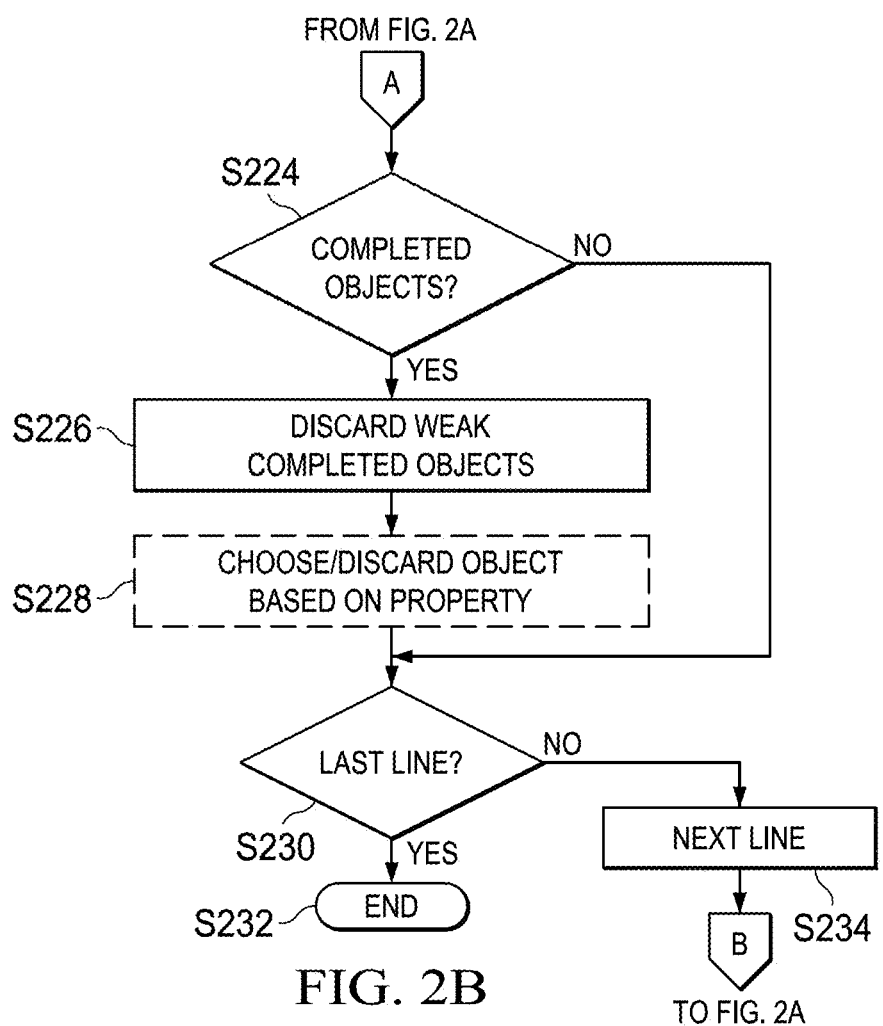

FIG. 2 is a simplified flow diagram illustrating potential operations associated with one embodiment. The operations start at S200 and optionally proceed to S202. At S202, types are assigned for each pixel. At S203, a run-length encoding is performed. At S204, it is determined whether there are any non-zero runs in a current row. If there are no non-zero runs, the algorithm proceeds to S224. If there are non-zero runs, the algorithm proceeds to S206.

In S206, the position and length of each non-zero run is determined. At S208, for each row, the number of neighbors to that run in the preceding row is determined. If the number of neighbors is 0, then a new label is generated at S210, and the algorithm proceeds to S222. If the number of neighbors is 1, then the run is assigned the label of that neighbor at S212, and the algorithm proceeds to S218.

If the number of neighbors is greater than 1, then the minimum label among roots of the neighbors is determined at S214. In S216, the correspondence maps of non-minimum labels are updated. In S218, an object having the minimum label is marked as strong, if any of those non-minimum labels is strong. In S220, the properties of the object are updated.

In S222, the label is marked as strong, if the run is strong (e.g., if the run includes a strong pixel). In S224, it is determined whether there are any completed objects. In one embodiment, this determination is based on whether any of the objects do not have any neighbors in the current row. If there are no completed objects in S224, then the algorithm proceeds to S230.

If there is a completed object, then, at S226, the completed object is selected if it is strong, and the object is discarded if it is weak. In addition, the object is optionally chosen or discarded in S228 based on a property of the object. In one embodiment, this property is having a width greater than a predetermined width. Of course, other properties can be used, such as size. The algorithm then proceeds to S230.

At S230, it is determined whether the algorithm has reached the end of the image, e.g., the last line of the image. In an embodiment in which the image is scanned in raster scan order, the last line of the image is the last row of the image. If it is determined that the algorithm has reached the end of the image, the algorithm ends at S232. If the algorithm has not reached the end of the image, the algorithm advances to the next line at S234 and returns to optional S202.

The algorithm will now be described in further detail. In one embodiment of the algorithm, at S202, types are assigned for each pixel based on at least one predetermined threshold. In an embodiment in which object features are extracted, a pixel intensity is compared against the at least one threshold.

In an embodiment in which contour properties are extracted, image gradients are calculated using a filter such as a Sobel filter, and a gradient magnitude is compared against the at least one threshold.

There are three categories of pixel: strong foreground, background, and weak foreground. All pixels with an intensity or gradient magnitude less than a low threshold Tlo are assigned '0' to indicate that pixel as a background pixel. Pixels having an intensity or gradient magnitude greater than or equal to the low threshold Tlo but less than a high threshold Thi are marked as '1' to indicate that pixel as a weak foreground pixel. All other pixels are marked as '2' to indicate those pixels as strong foreground pixels.

Binary thresholding can be considered as a special case of hysteresis thresholding where the low threshold Tlo is equal to the high threshold Thi. As such, the remaining sections focus on hysteresis thresholded images, although the same technique works fine for binary thresholded images.

All closed edges can be considered as contours, and their properties can be extracted. It is straight-forward to combine the thresholding with the algorithm, and a separate pass is not required for this combining. In at least one embodiment, this thresholding is already done, and an image with three levels (e.g., 0, 1, 2, as shown in FIG. 3) is the input to the algorithm. In such embodiments, the assignment of S202 is optional.

Further, in one embodiment, instead of comparing pixel or gradient intensity to a threshold, the thresholding process is preceded by a background modeling (such as a Mixture of Gaussians (MoG) model) process, and a pixel intensity or gradient intensity is compared against the background model. Further, in some cases of edge extraction, edge thinning algorithms such as Non-Maximal Suppression can precede thresholding. To not obfuscate the teachings of this disclosure, further details of background modeling and edge thinning algorithms are not further considered here.

At S203, the algorithm starts by scanning the edge map in raster scan order and performing a run-length encoding. At S204, it is determined whether there are any non-zero runs in a current row. In S206, for each non-zero run, the position and the length of the respective non-zero run are determined and recorded. In one implementation, an array (x, length, label) is recorded, where 'x' indicates the x-coordinate of the start of the run, 'length' indicates the number of pixels in the run, and 'label' indicates the label of the run. The label, for example, indicates an object to which the run belongs. Further, if the run contains a strong edge or strong foreground pixel, the run is marked as 'strong.' The label for each run is later assigned at S222.

As one example, run-length codes for an input edge or pixel map shown in FIG. 3 are shown in FIG. 4. The run-length codes of the entire image represented in FIG. 3 are shown in FIG. 4 for explanatory purposes, but there is no need to store this information for the whole image. Rather, it is sufficient to store the information of a current row and the preceding row only.

Connectivity can be easily verified in a run-length encoding (RLE) domain, because it is clear when two runs in consecutive rows are not connected. For example, two runs (X1, Count1) and (X2, Count2) in two consecutive rows are not connected if X1+Count1<X2 OR X2+Count2<X1. In all other cases, the two runs in the consecutive rows are connected.

Sometimes, components are connected and are marked as a same group using a correspondence map. Labels are grouped into sets such that all the labels that are part of a connected component fall into the same set, and all other labels fall into disjoint sets. Correspondence maps or equivalence maps store the information regarding the equivalence of two labels. Initially, the labels generated are not connected, not equivalent and are in disjoint sets. Whenever a run that connects two or more labels is encountered, an equivalence map is looked up to find the sets to which the labels belong. In the case that the labels belong to disjoint sets, then these sets are combined to indicate that they are part of a single connected component. Because it is determined which set a particular label is in and two sets can be joined into a single set, union-find data structures are well-suited to store equivalence or correspondence maps.

Among different union-find structures, a disjoint-set forest is asymptotically optimal for a find operation for a generic data set. Disjoint-set forests are data structures where each set is represented by a tree data structure in which each node holds a reference to its parent node. This is accomplished with, e.g., a vector array whose subscripts are the set of possible labels and whose values are the labels of the parent nodes. A value of zero means the node has no parents and is the root node of the tree. FIG. 7 shows two sets of label trees and a corresponding equivalence map for a conventional algorithm before processing the last row of FIG. 3.

Identifying the neighbors by using the connectivity formula can result in generating unnecessary labels for a single connected component. These generated labels should be merged, which results in an increased execution time. For example, in FIG. 5, there are only two connected components. However, if a conventional approach to identify the neighbor in a preceding row is followed, separate labels are given for each pixel just by looking at its preceding row neighbors. Then each of those labels is marked as a parent/child of another which increases the depth of a correspondence map tree. This, in turn, results in spending too much time in identifying the roots.

To overcome this problem, a new pixel map is generated in one embodiment by ORing two consecutive rows. For example, FIG. 6 shows an ORing of the two rows in FIG. 5. A RLE is then performed on the new pixel map instead of just a current row. Each such RLE forms a set of connected components, and a single label is sufficient for them. So, the neighbors of all the preceding runs are identified as the neighbors of a current run.

In S208, whenever a new run is encountered, the number of neighbors in the preceding row is checked. If there are one or more neighbors, an existing label is propagated to the current run as explained later.

If there are no neighbors, a new label is generated in S210. A minimum label (e.g., 1) is assigned to the first encountered run. One way to generate additional labels is to increment the label counter every time a run is encountered without neighbors in a preceding row. However, this will create a correspondence map with the same size as the maximum number of labels for the entire image.

For any given row, the maximum number of labels is M/2, where M is the width of the image. One approach uses a translation table to translate labels from a preceding row to a current row. Maintaining and using this translational table is not efficient and is time consuming for an object feature extraction.

Another approach uses a simpler way of generating labels that also keeps the memory the same as M/2. In this approach, a correspondence map of size M/2 is kept. However, labels are allowed to increment monotonically. A label is translated to a correspondence map index by a simple modulo operation. Each location in a correspondence map is associated with a flag that tells whether the label is active or not. A label number is incremented until a non-active location is found in the correspondence map. For a correspondence map with a size that is a power of 2 (e.g., 512, 1024, 2048, etc.), the modulo operation becomes a simple 'AND' operation which is available as a single instruction, even in most basic DSPs/micro controllers.

If there is only one neighbor in the preceding row, the label of that neighbor is propagated to a current run in S212.

Further, if it is determined in S208 that there is more than one neighbor, a conventional algorithm assigns a minimum label of the neighbors as a current label. However, this will lead to an increase in tree depth of a correspondence map and will increase the execution time of correspondence map updates. Thus, in some implementations, the algorithm determines a minimum label of the roots of the neighbors in the preceding row at S214 and assigns that label to a current run. This helps the propagation of only root labels, and all non-active labels automatically become inactive.

Whenever a new connection happens between two labels, the equivalence of those labels is updated in S216. The classic connected component algorithm recursively traces the correspondence or equivalence map until the algorithm finds the root of the respective trees that each label belongs to. If the two labels belong to different trees, the root node whose label is higher is made a child of the other. Even though the conventional technique works efficiently for small sizes, as the number of labels and tree depth increases, the conventional technique spends a lot of time in finding the root node for each connection. This performance can be improved by flattening the tree after each correspondence map update. However, as the number of labels grows, the algorithm spends too much time in flattening the tree.

Figure 9:
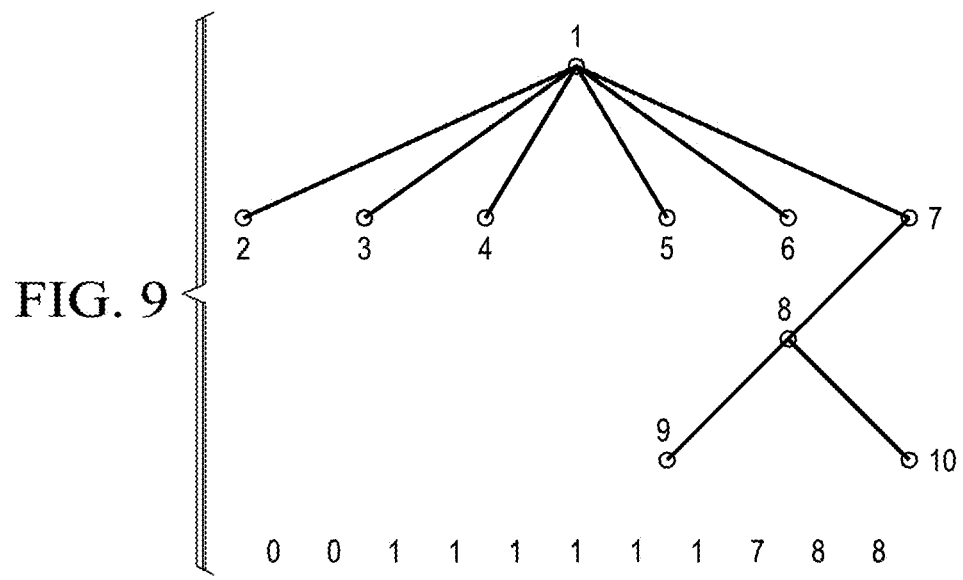
FIG. 9 illustrates an example of label trees and an equivalence map after a first pass for an algorithm for the edge map in FIG. 3 in accordance with one embodiment.

The present algorithm overcomes this issue by flattening out only the active part of the tree for each row. The way of identifying neighbors and propagating labels described in FIG. 2 implicitly flattens the active part of the tree. Thus, a separate flattening step is not required. Therefore, as the number of active labels is very small and is always guaranteed to be less than or equal to M/2 for an image of width M, the time spent in finding roots and updating the correspondence map is minimal. FIGS. 8 and 9 show a tree structure and an equivalence map for the present algorithm. Specifically, FIG. 8 shows an example of label trees and an equivalence map for the present algorithm before processing the last row of the map in FIG. 3. FIG. 9 illustrates an example of label trees and an equivalence map after a first pass for the present algorithm for the map in FIG. 3.

In S218, an object having the minimum label is marked as strong, if any of those non-minimum labels is strong.

Features (properties) are collected in S220 as and when a label is allotted to a run. Each label generated is associated with object feature information. If a new label is generated, the object feature information is initialized to indicate the feature information represents a new object. Whenever a label is propagated to a new run, e.g., in S212 or S214, the object feature information associated with the label is updated with the features of the new run. For example, in an embodiment concerning the total number of pixels in the object, the object feature information is updated by adding the length of the new run to an existing size of the object. Whenever a label is found to be a child of a different label, the parent object feature information (i.e., of the different label) is updated with the child object feature information. Since only the root node is propagated, all children labels can be discarded after every row.

In S222, the label is marked as strong, if the run is strong (e.g., if the run includes a strong pixel).

The algorithm can send the object features to the application as and when the object is complete after S224. The method of generating labels and updating correspondence maps as explained with regard to FIG. 2 helps to easily detect the completed objects. For example, whenever a label is propagated from a previous line to a current line, it is marked as incomplete. Because only root labels are propagated, an object corresponding to a root label which is not propagated is considered a completed object in S224. Thus, after labeling each row in S222, the algorithm in one embodiment checks in S224 for the root labels that are present in a previous row and not present in current row. At S226, the completed object is selected if it is strong, and the object is discarded if it is weak.

Consider an application that identifies objects whose width is greater than a predetermined width Wmin. Here, width is a property/feature of the object. The algorithm stores only objects that have a width greater than the predetermined width in S228. In a conventional method, all objects will be first identified and stored. Then, the features/properties will be calculated in a second pass to decide whether the objects match the criteria. This unnecessarily adds memory overhead for storing objects that do not match the criteria.

Approximate contour features can be extracted if an intensity gradient is thresholded, instead of a pixel magnitude. The contour features can be extracted similar to the object features. The algorithm can also check whether one contour lor object is enclosed by another contour.

In addition, the algorithm can be parallelized, and so it is suited for execution by multiple cores/processors. A respective slice of an image can be fed to each core or processor. The features of objects that span multiple slices can be combined by looking at the neighbors or labels of the first row of one slice and the last row of a previous slice. Either core or processor can look at the first row of the one slice and the last row of the previous slice. Alternatively or in addition, a third core or processor can look at the first row and last row of the slices.

Figure 10:
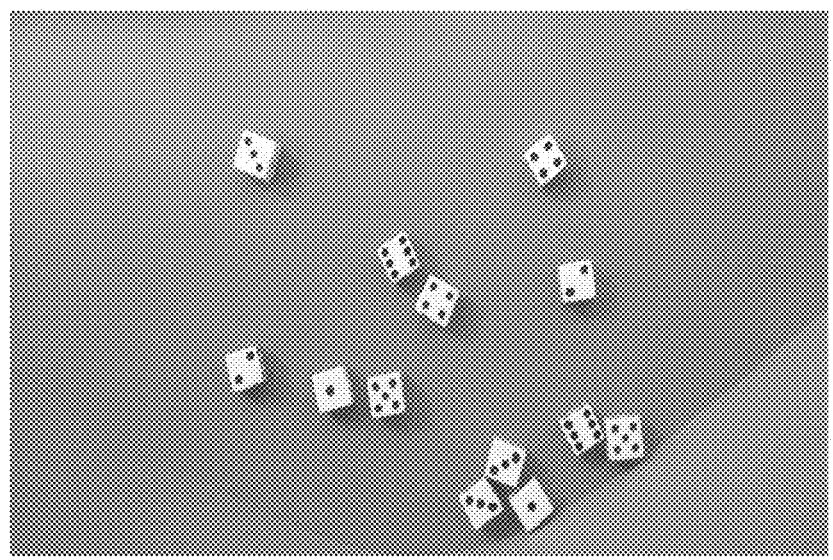
FIG. 10 illustrates an exemplary input image.

The algorithm has been implemented on a dual-core, fixed point digital signal processor (DSP), with a pipelined vision processor, running at 500 MHz. It was tested for object and contour properties such as length, area, image moments, Hu moments, etc. The algorithm and a conventional technique were implemented in assembly language to get the best results for the image of the set of dice shown in FIG. 10. DMA was used to bring data from an external memory to an internal memory.

Figure 11:
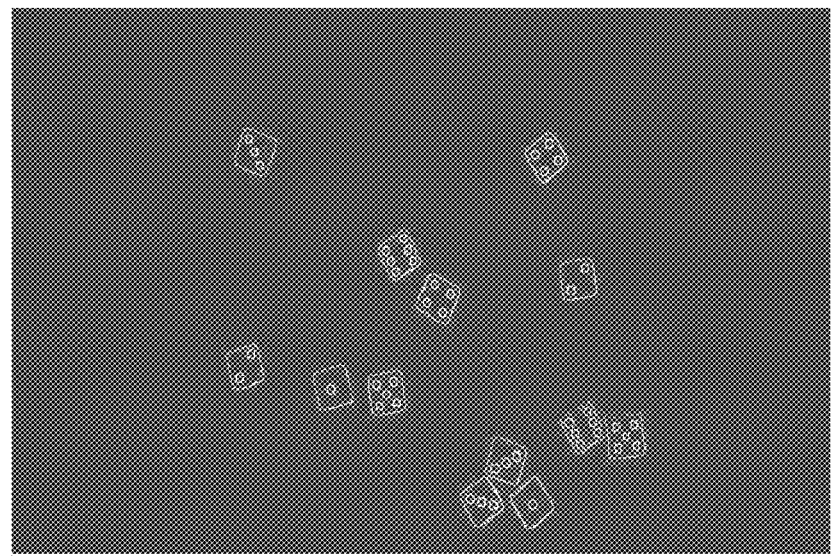
FIG. 11 illustrates an exemplary hysteresis-thresholded edge image.
Figure 12:
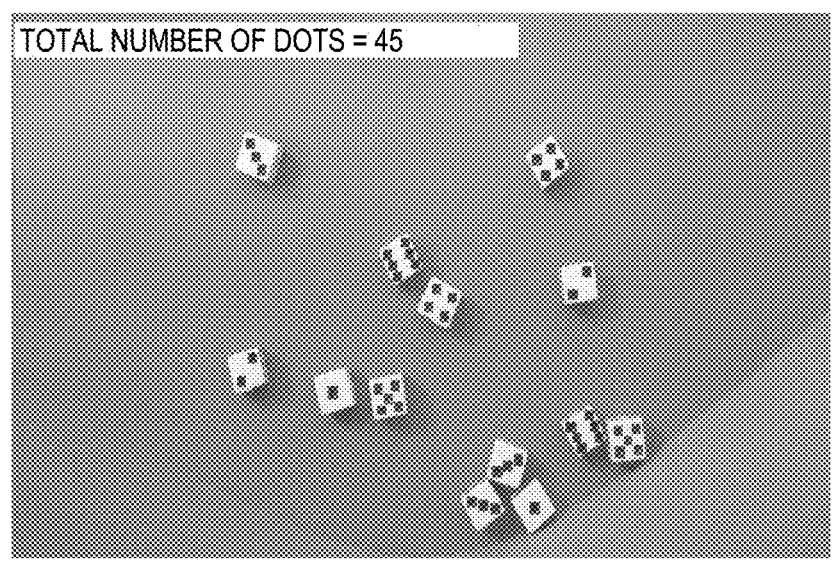
FIG. 12 illustrates an exemplary output image.

The algorithm was found to outperform the conventional technique in terms of memory usage and processing time. The output with the bounding boxes marked on the image is shown in FIG. 12. Table 1 gives a comparison of an average cycles per pixel and memory requirements for the algorithm and a conventional technique for extracting a bounding box and a length of dots for the image shown in FIG. 11. The pips are identified by looking at the size of the object and the size of the bounding box. The conventional technique used is a combination of edge tracing and contour tracing used in a Berkeley Design Technology Inc. (BDTI) demonstration of the same example during a launch of processors by Analog Devices Inc. As can be seen from Table 1, the proposed algorithm performs 6 times better than the conventional technique. Also, the memory requirement is reduced by 5 times compared to the conventional technique.

TABLE 1

Comparison of average cycles per pixel
and memory requirement for a typical use case

|  | Proposed | Conventional |
|---|---|---|
| Average cycles/pixel | 6.44 | 44.14 |
| Memory(Bytes) | 33228 | 186020 |

Further, for the conventional technique, the MIPS requirement for contour tracing will increase drastically in the presence of noise as the number of objects increases. An increase in cycles of the algorithm of this disclosure with the number of objects is found to be significantly less.

The algorithm of this disclosure thus consumes significantly less computational and memory resources compared to conventional techniques.

Figure 13:
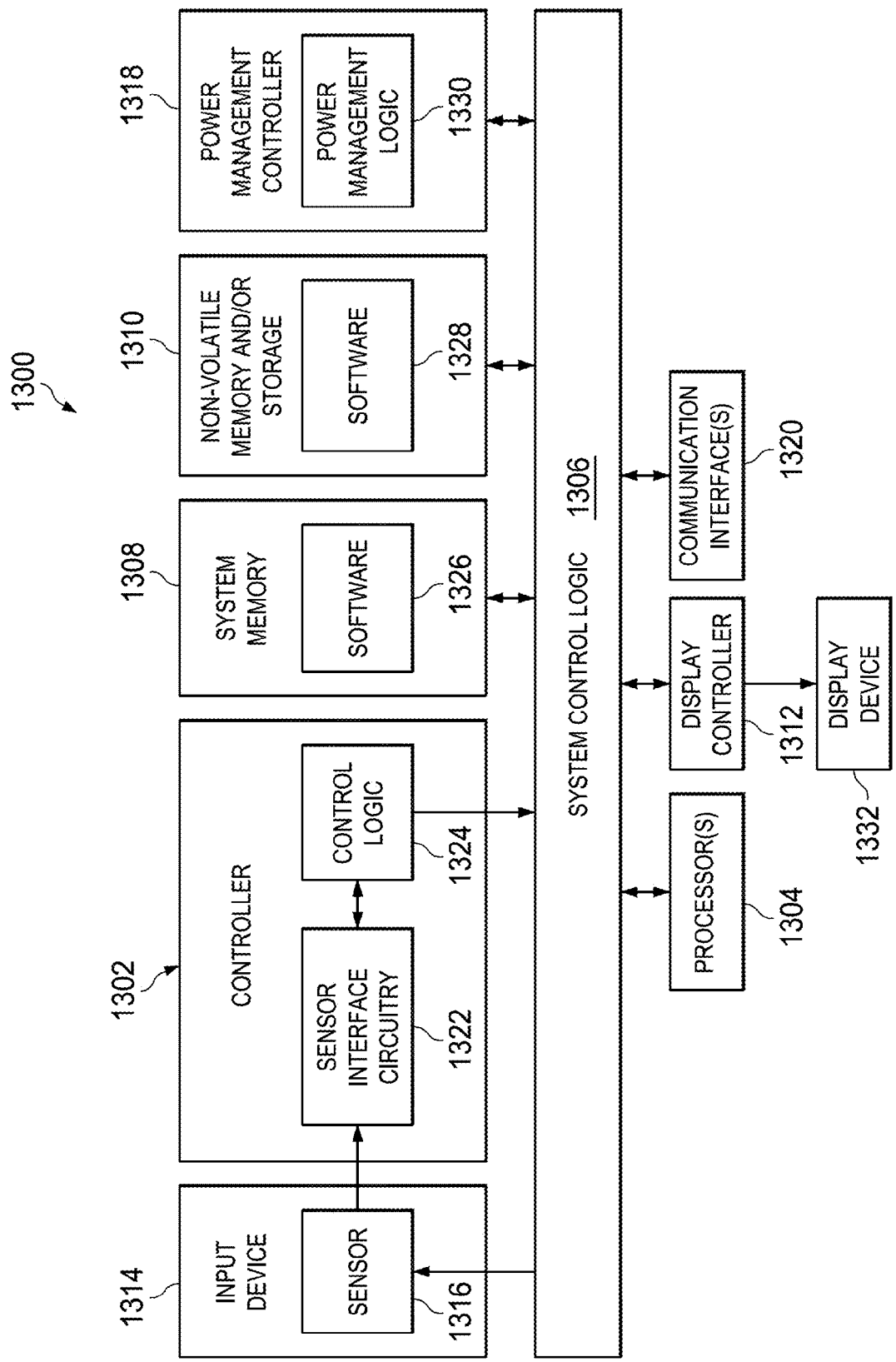
FIG. 13 illustrates components of a computer in accordance with one embodiment of the present disclosure.

FIG. 13 is a simplified block diagram illustrating electronics associated with an example computer system 1300 that can be programmed to execute an embodiment of the present disclosure. System 1300 includes a touch input device 1314, a touch controller 1302, one or more processors 1304, system control logic 1306 coupled to at least one of processor(s) 1304, system memory 1308 coupled to system control logic 1306, non-volatile memory and/or storage device(s) 1310 coupled to system control logic 1306, display controller 1312 coupled to system control logic 1306, display controller 1312 coupled to a display, power management controller 1318 coupled to system control logic 1306, and communication interface(s) 1320 coupled to system control logic 1306.

Touch input device 1314 includes touch sensor 1316, and each can be implemented using any suitable touch-sensitive technology such as, for example and without limitation, capacitive, resistive, surface acoustic wave (SAW), infrared, and optical imaging. Touch input device 1314, in a particular embodiment, is implemented using any suitable single or multi-touch technology.

System control logic 1306, in a particular embodiment, includes suitable interface controllers to provide for any suitable interface to at least one processor 1304 and/or to any suitable device or component in communication with system control logic 1306. System control logic 1306, in a particular embodiment, includes one or more memory controllers to provide an interface to system memory 1308. System memory 1308 can be used to load and store data and/or instructions, such as software 1326, for example. System memory 1308, in a particular embodiment, includes any suitable memory, such as suitable dynamic random access memory (DRAM) or SDRAM or ROM, for example. System control logic 1306, in a particular embodiment, includes one or more input/output (I/O) controllers to provide an interface to a display device 1332, touch controller 1302, and non-volatile memory and/or storage device(s) 1310.

Non-volatile memory and/or storage device(s) 1310 store data and/or instructions, for example, within software 1328. Non-volatile memory and/or storage device(s) 1310 can include any suitable non-volatile memory, such as flash memory, for example, and/or any suitable non-volatile storage device(s), such as one or more hard disc drives (HDDs), one or more compact disc (CD) drives, and/or one or more digital versatile disc (DVD) drives, for example.

Power management controller 1318 includes power management logic 1330 configured to control various power management and/or power saving functions of computer 1300 based upon an open configuration or a closed configuration and/or a physical orientation or unused state of computer 1300. In one embodiment, power management controller 1318 is configured to reduce the power consumption of components or devices of system 1300 that can be operated at reduced power. For example, in a particular embodiment when computer 1300 has not recently been used, power management controller 1318 performs one or more of the following: power down an unused portion of the display and/or any backlight associated therewith; allow one or more of processor(s) 1304 to go to a lower power state if less computing power is appropriate; and shutdown any devices and/or components, such as a keyboard, that are unused.

Communications interface(s) 1320 can provide an interface for system 1300 to communicate over one or more networks and/or with any other suitable device. Communications interface(s) 1320 can include any suitable hardware and/or firmware. Communications interface(s) 1320, in a particular embodiment, includes, for example, a network adapter, a wireless network adapter, a telephone modem, and/or a wireless modem.

System control logic 1306, in a particular embodiment, includes one or more input/output (I/O) controllers to provide an interface to any suitable input/output device(s) such as, for example, a microphone, a speaker, a camera, a camcorder, a printer, and/or a scanner.

In one embodiment, at least one processor 1304 is packaged together with logic for one or more controllers of system control logic 1306 to form a System in Package (SiP). In one embodiment, at least one processor 1304 is integrated on the same die with logic for one or more controllers of system control logic 1306. For a particular embodiment, at least one processor 1304 is integrated on the same die with logic for one or more controllers of system control logic 1306 to form a System on Chip (SoC).

For touch control, touch controller 1302 can include touch sensor interface circuitry 1322 and touch control logic 1324. Touch sensor interface circuitry 1322 can detect a touch input over a first touch surface layer and a second touch surface layer of a display (e.g., display device 1332). Touch sensor interface circuitry 1322 can include any suitable circuitry that can depend, for example, at least in part, on the touch-sensitive technology used for touch input device 1314. Touch sensor interface circuitry 1322, in one embodiment, can support any suitable single or multi-touch technology. Touch sensor interface circuitry 1322, in one embodiment, includes any suitable circuitry to convert analog signals corresponding to the first touch surface layer and the second touch surface layer into digital touch input data. Digital touch input data for one embodiment includes, for example, touch location or coordinate data.

Touch control logic 1324 helps control touch sensor interface circuitry 1322 to detect a touch input over the first touch surface layer and the second touch surface layer. Touch control logic 1324 for one embodiment can output digital touch input data corresponding to a touch input detected by touch sensor interface circuitry 1322. Touch control logic 1324 can be implemented using any suitable logic, including hardware, firmware, and/or software logic (e.g., non-transitory tangible media), that can depend at least in part on the circuitry used for touch sensor interface circuitry 1322. Touch control logic 1324 supports any suitable single or multi-touch technology.

Touch control logic 1324 can be coupled to output digital touch input data to system control logic 1306 and/or at least one processor 1304 for processing. At least one processor 1304 for one embodiment can execute software to process digital touch input data output from touch control logic 1324. Suitable software can include, for example, driver software and/or application software. As illustrated in FIG. 13, system memory 1308 can store suitable software 1326 and can be implemented in non-volatile memory and/or storage device(s).

Modifications

In the previous description, the algorithm was applied to the pixels in raster scan order. However, other orders can be used. For example, rather than considering the pixels row-by-row, the pixels can be considered column-by-column. Alternatively, the algorithm can be implemented in reverse raster scan order or other orders.

The description generally refers to actions of a processor. Such a processor is an example of a processing means for performing operations of the algorithm set forth in FIG. 2.

In one embodiment, a processor reads instructions from a medium to perform the algorithm. This medium can be transitory or non-transitory. Exemplary transitory media include a propagating wave or a signal, and computer instructions per se. Exemplary non-transitory media include a magnetic disc, an optical disc, a magneto-optical disc, or a flash memory. Other non-transitory media include RAM and ROM.

The activities discussed above with reference to the FIGURES are applicable to any integrated circuits that involve image processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

The features discussed herein can be applied to computer vision generally. For example, one context to which the features can be applied is defect detection in conveyor lines in automated assembly lines. In such an application, the object of interest can be a screw, a bottle, etc. The application identifies a defective object and flags it appropriately.

The features can also be applied to printed character recognition, such as license plate recognition, surveillance, etc. The teachings of this disclosure can also be applied in automotive applications such as speed limit recognition to identify speed limits and associated characters (if any) in the speed limit sign. In such applications, contours that match properties of a rectangle are extracted. Thus, objects corresponding to letters/numbers are extracted, and the letters/numbers are classified based on their properties.

In other contexts, the features can be applied to scientific instrumentation, radar, industrial process control, video equipment, and other digital-processing-based systems. Further, certain embodiments can be provisioned in digital signal processing technologies for medical imaging systems, medical instrumentation, patient monitoring, and home healthcare. This could include pulmonary monitors, accelerometers, heart rate monitors, pacemakers, etc. Other applications can involve automotive technologies for safety systems (e.g., driver assistance system and info-tainment).

In yet other example scenarios, the teachings of the present disclosure can be applied in industrial markets that include process control systems that help drive productivity, energy efficiency, and reliability. In consumer applications, the teachings of the signal processing discussed above can be used for image processing, auto focus, and image stabilization (e.g., for digital still cameras, camcorders, etc.). Other consumer applications can include video processors for home theater systems, DVD recorders, and high-definition televisions. Yet other consumer applications can involve advanced touch screen controllers (e.g., for any type of portable media device). Hence, such technologies could readily be a part of smartphones, tablets, security systems, PCs, gaming technologies, virtual reality, simulation training, etc.

The arrangements of FIGS. 1-13 are simply for discussion purposes, where various alternatives and modifications to such arrangements are within the scope of the present disclosure. Along similar lines, the processing and memory allocations of FIGS. 1-13 can be shared by other components, consolidated, or otherwise distributed across different devices. Such modifications can be based on particular image processing needs, specific environments, etc.

In certain implementations, the extraction functions outlined herein are implemented by logic encoded in one or more tangible media (e.g., embedded logic provided in an application specific integrated circuit [ASIC], digital signal processor [DSP] instructions, software [potentially inclusive of object code and source code] to be executed by a processor or any other similar machine, etc.). In some of these instances, a memory element stores data for the extraction operations described herein. The memory element is able to store software, logic, code, or processor instructions that are executed to carry out the activities described in this disclosure. A processor can execute any type of instructions to achieve the operations detailed in this disclosure. In one example, the processor transforms an element or an article (e.g., data) from one state or thing to another state or thing. In another example, the extraction activities outlined herein are implemented with fixed logic or programmable logic (e.g., software/computer instructions executed by a processor), such as a programmable processor, programmable digital logic (e.g., field-programmable gate array (FPGA), an erasable programmable read only memory (EPROM), an electronically erasable programmable read only memory (EEPROM), or an ASIC) that includes digital logic, software, code, or electronic instructions.

In a general sense, the arrangements depicted in the preceding FIGURES may be more logical in their representations, whereas a physical architecture may include various permutations, combinations, or hybrids of these elements. In one embodiment, the features of this disclosure are provided externally to any of the aforementioned elements (e.g., included in a server) or included in another device to achieve the disclosed functionalities. In other embodiments, any of the devices of the FIGURES may include additional algorithms, hardware, software, components, modules, interfaces, or objects that facilitate these extraction operations.

All of the aforementioned devices can keep information in any suitable memory element, software, hardware, or in any other suitable component, device, element, or object where appropriate and based on particular needs. Any of the potential processing elements, modules, and machines described in this disclosure should be construed as encompassed within the broad term 'processor.'

With the examples provided herein, interaction has been described in terms of two, three, four, or more elements. However, this has been done for purposes of clarity and example only. In certain cases, it may be easier to describe one or more of the functionalities of a given set of flows by only referencing a limited number of elements. System 1300 (and its teachings) are readily scalable and can accommodate a large number of components, as well as more complicated/sophisticated arrangements and configurations. Accordingly, the examples provided should not limit the scope or inhibit the broad teachings of system 1300 as potentially applied to a myriad of other architectures.

The preceding flow diagrams illustrate only some of the scenarios and patterns that may be executed by, or within, system 1300. Some operations can be deleted, removed, modified, or changed considerably without departing from the scope of the present disclosure. In addition, a number of these operations have been described as being executed concurrently with, or in parallel to, one or more additional operations. However, the timing of these operations can be altered considerably. The preceding operational flows have been offered for purposes of example and discussion. Substantial flexibility is provided by system 1300 in that any suitable arrangements, chronologies, configurations, and timing mechanisms can be provided without departing from the teachings of the present disclosure.

Although the present disclosure has been described in detail with reference to particular arrangements and configurations, these example configurations and arrangements can be changed significantly without departing from the scope of the present disclosure.

Further, although system 1300 has been illustrated with reference to particular elements and operations that facilitate the extraction process, these elements and operations may be replaced by any suitable architecture or process that achieves the intended functionality of system 1300.

Additionally, although the previous discussions have focused on computers, handheld devices that employ video applications could readily adopt the teachings of the present disclosure. For example, iPhones, iPads, Google Android-operated devices, personal computing applications (e.g., desktop video solutions), etc., can use the teachings detailed above. Any communication system or device that processes and/or receives video data would also be amenable to the teachings discussed herein.

Numerous other changes, substitutions, variations, alterations, and modifications can be ascertained to one skilled in the art, and it is intended that the present disclosure encompass all such changes, substitutions, variations, alterations, and modifications as falling within the scope of the appended claims. To assist the United States Patent and Trademark Office (USPTO) and, additionally, any readers of any patent issued on this application in interpreting the claims appended hereto, Applicants wish to note the Applicants: (a) do not intend any of the appended claims to invoke 35 U.S.C. section 112(f) as it exists on the date of the filing hereof unless the words "means for" or "step for" are specifically used in the particular claims; and (b) do not intend, by any statement in the specification, to limit this disclosure in any way that is not otherwise reflected in the appended claims.

What is claimed is:

1. A method implemented with a processor, the method comprising:
    determining a position and length of a non-zero run in a row of a pixel map;
    determining, with the processor, a minimum label of roots of at least two neighbors in a preceding row of the pixel map, in response to a determination, based at least in part on the position and the length, that the non-zero run neighbors the at least two neighbors; and
    updating a correspondence map of the non-zero run and a correspondence map of a first neighbor of the at least two neighbors, based at least in part on a correspondence map of a second neighbor of the at least two neighbors, in response to the determination that the non-zero run neighbors the at least two neighbors.

2. The method of claim 1, further comprising:
    assigning to the non-zero run the minimum label of the roots of the at least two neighbors.

3. The method of claim 1, further comprising:
    updating a size of an object including the non-zero run, the first neighbor, and the second neighbor, in response to the determination.

4. The method of claim 3, further comprising:
    updating the size of the object based at least in part of the length of the non-zero run.

5. The method of claim 1, further comprising:
    determining that an object is completed, in response to a determination that the non-zero run has no neighbors in the preceding row.

6. The method of claim 1, wherein the determination includes ORing the row with the preceding row.

7. The method of claim 1, further comprising:
    discarding an object, based at least in part on an intensity of a pixel in the non-zero run and a predetermined threshold.

8. At least one non-transitory computer readable medium that includes code for execution and, when executed by a processor, operable to perform operations comprising:
    determining a position and length of a non-zero run in a row of a pixel map;
    determining a minimum label of roots of at least two neighbors in a preceding row of the pixel map, in response to a determination, based at least in part on the position and the length, that the non-zero run neighbors the at least two neighbors; and
    updating a correspondence map of the non-zero run and a correspondence map of a first neighbor of the at least two neighbors, based at least in part on a correspondence map of a second neighbor of the at least two neighbors, in response to the determination that the non-zero run neighbors the at least two neighbors.

9. The medium of claim 8, the operations further comprising:
    assigning to the non-zero run the minimum label of the roots of the at least two neighbors.

10. The medium of claim 8, the operations further comprising:
    updating a size of an object including the non-zero run, the first neighbor, and the second neighbor, in response to the determination.

11. The medium of claim 10, the operations further comprising:
    updating the size of the object based at least in part of the length of the non-zero run.

12. The medium of claim 8, the operations further comprising:
    determining that an object is completed, in response to a determination that the non-zero run has no neighbors in the preceding row.

13. The medium of claim 8, wherein the determination includes ORing the row with the preceding row.

14. The medium of claim 8, the operations further comprising:
    discarding an object, based at least in part on an intensity of a pixel in the non-zero run and a predetermined threshold.

15. An apparatus, comprising:
    a processor that determines a position and length of a non-zero run in a row of a pixel map, the processor configured to determine a minimum label of roots of at least two neighbors in a preceding row of the pixel map, in response to a determination, based at least in part on the position and the length, that the non-zero run neighbors the at least two neighbors, and to update a correspondence map of the non-zero run and a correspondence map of a first neighbor of the at least two neighbors, based at least in part on a correspondence map of a second neighbor of the at least two neighbors, in response to the determination that the non-zero run neighbors the at least two neighbors.

16. The apparatus of claim 15, wherein the processor assigns to the non-zero run the minimum label of the roots of the at least two neighbors.

17. The apparatus of claim 15, wherein the processor updates a size of an object including the non-zero run, the first neighbor, and the second neighbor, in response to the determination.

18. The apparatus of claim 17, wherein the processor updates the size of the object based at least in part of the length of the non-zero run.

19. The apparatus of claim 15, wherein the processor is configured to determine that an object is completed, in response to a determination that the non-zero run has no neighbors in the preceding row.

20. The apparatus of claim 15, wherein the processing unit determines that the non-zero run neighbors the at least two neighbors by ORing the row with the preceding row.

* * * * *